(12) United States Patent
Chen

(10) Patent No.: US 12,149,995 B2
(45) Date of Patent: Nov. 19, 2024

(54) HANDOVER METHOD AND TERMINAL

(71) Applicant: VIVO MOBILE COMMUNICATION CO., LTD., Guangdong (CN)

(72) Inventor: Li Chen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 476 days.

(21) Appl. No.: 17/502,146

(22) Filed: Oct. 15, 2021

(65) Prior Publication Data

US 2022/0038972 A1 Feb. 3, 2022

Related U.S. Application Data

(63) Continuation of application No. PCT/CN2020/086700, filed on Apr. 24, 2020.

(30) Foreign Application Priority Data

Apr. 26, 2019 (CN) .......................... 201910345899.3

(51) Int. Cl.
*H04W 36/36* (2009.01)
*H04W 36/00* (2009.01)

(52) U.S. Cl.
CPC . *H04W 36/00837* (2018.08); *H04W 36/0079* (2018.08); *H04W 36/0094* (2013.01)

(58) Field of Classification Search
None
See application file for complete search history.

(56) References Cited

U.S. PATENT DOCUMENTS

| 9,173,151 B2* | 10/2015 | Choi ..................... H04W 36/04 |
| 10,536,890 B2* | 1/2020 | Basu Mallick ... H04W 36/0005 |
| 2018/0098258 A1* | 4/2018 | Annam ............... H04W 36/305 |
| 2019/0223073 A1* | 7/2019 | Chen ................... H04W 36/365 |
| 2019/0281511 A1* | 9/2019 | Susitaival ............. H04W 36/36 |
| 2019/0387440 A1* | 12/2019 | Yiu ................. H04W 36/00837 |

FOREIGN PATENT DOCUMENTS

| CN | 103220736 A | 7/2013 |
| CN | 104469873 A | 3/2015 |
| CN | 109392039 A | 2/2019 |
| CN | 111565426 A | 8/2020 |
| WO | 2018132051 A1 | 7/2018 |
| WO | 2018156696 A1 | 8/2018 |

(Continued)

OTHER PUBLICATIONS

International Search Report and Written Opinion (with English translation) issued in International Patent Application No. PCT/CN2020/086700, 10 pages, Jun. 10, 2020.

(Continued)

*Primary Examiner* — Ajit Patel
(74) *Attorney, Agent, or Firm* — IP & T GROUP LLP

(57) ABSTRACT

A handover method includes: falling back, by a terminal to a handover process indicated by a handover command, or continuing, by the terminal, to perform a conditional handover in the case that the handover command sent by a source cell is received during a process of the conditional handover. The handover command does not carry a trigger condition for a conditional handover.

19 Claims, 2 Drawing Sheets

(56) References Cited

FOREIGN PATENT DOCUMENTS

WO      2018175819 A1    9/2018
WO      2018188078 A1    10/2018

OTHER PUBLICATIONS

First Office Action (with English translation) issued in Chinese Patent Application No. 201910345899.3, 17 pages, Dec. 29, 2020.
Second Office Action (with English translation) issued in Chinese Patent Application No. 201910345899.3, 12 pages, Jul. 13, 2021.
Handover in single connectivity scenario, 3GPP TSG-RAN WG2 Meeting Ad hoc R2-1700179, Jan. 16-20, 2017, Spokane, USA, Source: Huawei, HiSilicon.
Regarding Ping-Pong issue of Conditional Handover, 3GPP TSG-RAN2#102 R2-1808449, May 21-25, 2018, Busan, Korea, Source: Samsung.
Performance evaluation of conditional handover, 3GPP TSG RAN WG2 Meeting #104 R2-1816692, Nov. 8-12, 2018, Spokane, USA, Source: Intel Corporation.
Conditional Handover Procedures, 3GPP TSG-RAN WG2 Meeting #104 R2-1816959, Nov. 12-16, 2018, Spokane, WA, USA, Source: MediaTek Inc.
Triggering condition of Pre-BSR, 3GPP TSG-RAN WG2 Meeting #105bis R2-19003343, Apr. 8-12, 2019, Xi'an, China, Source: vivo.
Office Action on the Chinese Patent Application No. 202111493366.3 issued by the Chinese Patent Office on Feb. 29, 2024.
R2-1903443, "Discussion of conditional handover", 3GPP TSG RAN WG2 Meeting #105bis, Apr. 8-12, 2019, pp. 1-7, Xi'an, China.

\* cited by examiner

HANDOVER METHOD AND TERMINAL

CROSS-REFERENCE TO RELATED APPLICATIONS

This application is a Bypass Continuation Application of PCT/CN2020/086700, filed on Apr. 24, 2020, which claims priority to Chinese Patent Application No. 201910345899.3 filed on Apr. 26, 2019, which are incorporated herein by reference in their entireties.

TECHNICAL FIELD

The present disclosure relates to the field of communications technologies, and in particular, to a handover method and a terminal.

BACKGROUND

During a handover process in the related art, when a terminal initiates a handover to a target cell, the terminal no longer receives a configuration or related indication information from a source cell.

To avoid a handover failure caused because the terminal cannot receive a handover command related message from the source cell after a channel condition of the source cell deteriorates, a conditional handover procedure is introduced.

SUMMARY

Embodiments of the present disclosure provide a handover method and a terminal.

An embodiment of the present disclosure provides a handover method, applied to a terminal and including:
  falling back, by the terminal to a handover process indicated by a handover command, or continuing, by the terminal, to perform a conditional handover in the case that the handover command sent by a source cell is received during a process of the conditional handover, where
  the handover command does not carry a trigger condition for a conditional handover.

An embodiment of the present disclosure further provides a terminal, including:
  a handover module, configured to fall back to a handover process indicated by a handover command, or continue to perform a conditional handover in the case that the handover command sent by a source cell is received during a process of the conditional handover, where
  the handover command does not carry a trigger condition for a conditional handover.

An embodiment of the present disclosure further provides a terminal, including: a processor, a memory, and a program stored in the memory and executable on the processor. When the computer program is executed by the processor, the steps of the foregoing handover method are implemented.

An embodiment of the present disclosure further provides a non-transitory computer-readable storage medium. The non-transitory computer-readable storage medium stores a computer program, and when the computer program is executed by a processor, the steps of the foregoing handover method are implemented.

BRIEF DESCRIPTION OF DRAWINGS

To better clarify the technical solutions in the embodiments of the present disclosure, the accompanying drawings for describing the embodiments of the present disclosure are briefly described below. Apparently, the accompanying drawings described below merely illustrate some of the embodiments of the present disclosure. A person of ordinary skill in the art can derive other accompanying drawings from these accompanying drawings.

DESCRIPTION OF EMBODIMENTS

Figure 1:
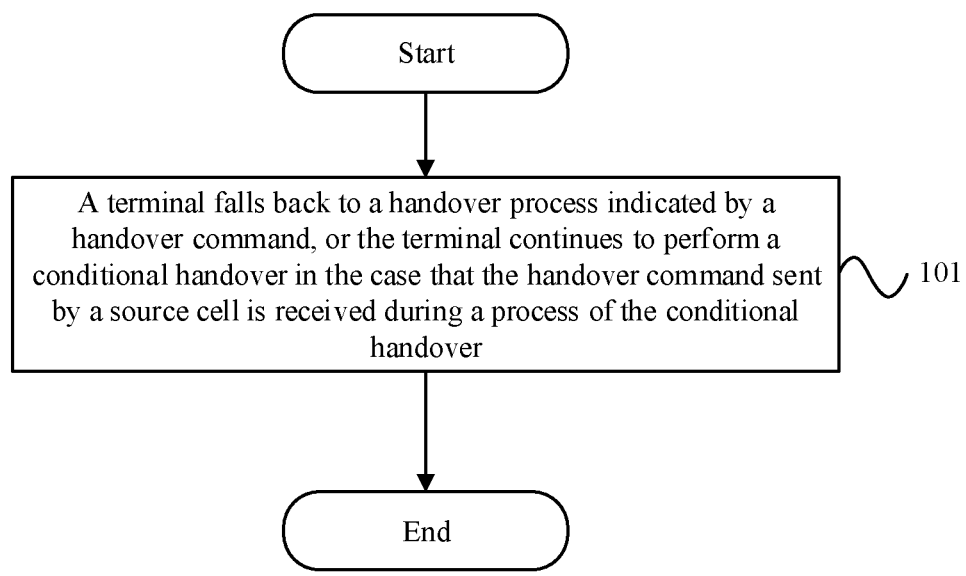
FIG. 1 is a schematic diagram of steps of a handover method according to an embodiment of the present disclosure.

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure shall fall within the protection scope of the present disclosure.

In the embodiments of the present disclosure, the term such as "exemplary" or "for example" is used to represent an example, an instance, or an illustration. Any embodiment or design scheme described as "exemplary" or "for example" in the embodiments of the present disclosure should not be construed as being more preferred or advantageous than another embodiment or design scheme. Exactly, use of the term such as "exemplary" or "for example" is intended to present a concept in a specific manner.

The term "and/or" in this specification describes an association relationship of associated objects, indicating that three relationships may exist. For example, A and/or B may indicate three cases: Only A exists, both A and B exist, and only B exists.

A terminal provided in the embodiments of the present disclosure may be a mobile phone, a tablet computer, a laptop computer, an ultra-mobile personal computer (UMPC), a netbook, a wearable device, an in-vehicle device, a personal digital assistant (PDA) or the like. It should be noted that a specific type of the terminal is not limited in this embodiment of the present disclosure. In the embodiments of the present disclosure, LTE and NR systems are used as examples, but the present disclosure is not limited to these systems. The technical solutions provided in the present disclosure can be applied to other systems with the same problems.

Main steps of a process of the conditional handover in the related art are as follows:
  Step 1: A source cell sends handover request information to one or more target cells.
  Step 2: The target cell feeds back handover acknowledgement information to the source cell.
  Step 3: The source cell sends configuration information for a conditional handover to a terminal.
  Step 4: The terminal assesses whether a candidate cell meets a condition, and selects a target cell for a handover after the condition is met.
  Step 5: The terminal initiates a random access process to the selected target cell.
  Step 6: The terminal sends handover complete information to the target cell.

Step 7: The source cell sends conditional handover cancellation command to another target cell.

Step 8: The another target cell sends a conditional handover cancellation acknowledgement command to the source cell.

In a current conditional handover process, when determining that a trigger condition is met, the terminal performs the handover process to initiate access to the target cell. If the terminal receives, in this process, a common handover command sent by the source cell, there is no corresponding processing procedure.

As shown in FIG. 1, an embodiment of the present disclosure provides a handover method, applied to a terminal and including:

Step 101: The terminal falls back (fallback) to a handover process indicated by a handover command, or the terminal continues to perform a conditional handover in the case that the handover command sent by a source cell is received during a process of the conditional handover.

The handover command does not carry a trigger condition for a conditional handover.

In this embodiment of the present disclosure, without loss of generality, the process of the conditional handover includes:

the source cell sends a handover request to at least one candidate target cell;
(optional) the candidate target cell performs access control on the terminal, that is, the candidate target cell reserves or configures a resource for a terminal handover, where the resource is used by the terminal to perform random access to this target cell;
if the access control is allowed, the candidate target cell sends a handover response to the source cell, which optionally includes a handover command (transparently transmitted to the terminal through the source cell);
the source cell sends, to the terminal, a message (such as an RRC reconfiguration message or a mobility control message MobilityControl) including the handover command, optionally including the trigger condition for a conditional handover; and
if a measurement result by the terminal meets the trigger condition for a conditional handover, the terminal initiates access to a corresponding target cell.

It should be noted that the handover command sent by the source cell and received during the process of the conditional handover is a common handover command, namely, a handover command that does not carry the trigger condition for a conditional handover.

In an optional embodiment, in the foregoing embodiment of the present disclosure, step 101 includes:

in the case that the handover command sent by the source cell is received before the trigger condition for a conditional handover is met or before the terminal initiates access to a first target cell that meets the trigger condition for a conditional handover, falling back, by the terminal, to the handover process indicated by the handover command.

In this embodiment of the present disclosure, initiating access to a specific cell includes: initiating a random access process or an RRC connection establishment process or an attach process to the cell.

In the case that the handover command sent by the source cell is received by the terminal before the trigger condition for a conditional handover is met, the terminal directly falls back to the handover process indicated by the handover command; or in the case that the handover command sent by the source cell is received by the terminal before the terminal initiates access to the first target cell, the terminal directly falls back to the handover process indicated by the handover command, where the first target cell is a target cell that is determined by the terminal and that meets the trigger condition for a conditional handover.

Optionally, the falling back, by the terminal to a handover process indicated by a handover command includes:

falling back, by the terminal, to the handover process indicated by the handover command; or falling back, by the terminal after a preset time length, to the handover process indicated by the handover command.

Optionally, the falling back, by the terminal to a handover process indicated by a handover command includes:

terminating, by the terminal, the process of the conditional handover; or skipping, by the terminal, initiating access to the first target cell that meets the trigger condition for a conditional handover.

Optionally, the terminating, by the terminal, the process of the conditional handover includes:

stopping a first timer and/or second timer that is operating.

The first timer is a timer used to determine whether the conditional handover fails, for example, the first timer is T304.

The second timer is a timer used to control conditional handover configuration or deconfiguration. For example, the second timer may be referred to as T3xx or the like.

It should be noted that, during an operating period of the second timer, a handover command for the conditional handover is valid or configuration information of the conditional handover is valid; otherwise, a handover command for the conditional handover is invalid or configuration information of the conditional handover is invalid.

Optionally, the second timer is used to determine whether a random access resource reserved or configured for the terminal handover by the candidate target cell is valid. For example, during the operating period of the second timer, the random access resources reserved or configured for the terminal handover by the candidate target cell is valid; and when the second timer expires or is stopped, random access resource reserved or configured for the terminal handover by the candidate target cell becomes invalid.

Optionally, the falling back, by the terminal to a handover process indicated by a handover command includes:

initiating access to a second target cell corresponding to the handover command.

Optionally, the initiating access to a second target cell corresponding to the handover command includes:

initiating, by the terminal, access to the second target cell by using a resource configured by the handover command for the conditional handover (which may be referred to as a conditional handover command); or
initiating, by the terminal, access to the second target cell by using a resource configured by a handover command (which may be referred to as a common handover command) that is sent by the source cell and that is received during the process of the conditional handover.

Optionally, the method further includes:

stopping, by the terminal, a first timer and/or second timer that is operating; or
restarting, by the terminal, a first timer and/or second timer; or
in the case that the terminal initiates access to the second target cell by using a resource configured by a handover command for the conditional handover, continuing, by
the terminal, to run a first timer and/or a second timer,
where
the first timer is a timer used to determine whether the
conditional handover fails; and
the second timer is a timer used to control conditional
handover configuration or deconfiguration.

During an operating period of the second timer, a handover command for the conditional handover is valid or configuration information of the conditional handover is valid; otherwise, a handover command for the conditional handover is invalid or configuration information of the conditional handover is invalid.

Optionally, the second timer is used to determine whether a random access resource reserved or configured for the terminal handover by the candidate target cell is valid. For example, during the operating period of the second timer, the random access resources reserved or configured for the terminal handover by the candidate target cell is valid; and when the second timer expires or is stopped, random access resource reserved or configured for the terminal handover by the candidate target cell becomes invalid.

In an optional embodiment, in the foregoing embodiment of the present disclosure, step 101 includes:
in the case that the handover command sent by the source cell is received after the trigger condition for a conditional handover is met or after the terminal initiates access to a first target cell that meets the trigger condition for a conditional handover or before the terminal successfully accesses a first target cell that meets the trigger condition for a conditional handover, falling back, by the terminal, to the handover process indicated by the handover command; or
in the case that the handover command sent by the source cell is received after the trigger condition for a conditional handover is met or after the terminal initiates access to a first target cell that meets the trigger condition for a conditional handover or before the terminal successfully accesses a first target cell that meets the trigger condition for a conditional handover, continuing, by the terminal, to perform the conditional handover.

It should be noted, if a first target cell that meets the trigger condition for a conditional handover or a first target cell that is being accessed by the terminal is different from the second target cell corresponding to the handover command, the terminal falls back to the handover process indicated by the handover command; or
if a first target cell that meets the trigger condition for a conditional handover or a first target cell that is being accessed by the terminal is the same as the second target cell corresponding to the handover command, the terminal falls back to the handover process indicated by the handover command.

It should be further noted that, if the first target cell that meets the trigger condition for a conditional handover or the first target cell that is being accessed by the terminal is the same as the second target cell corresponding to the handover command, the terminal continues to perform the conditional handover.

Optionally, the falling back, by the terminal to a handover process indicated by a handover command includes:
falling back, by the terminal, to the handover process indicated by the handover command; or falling back, by the terminal after a preset time length, to the handover process indicated by the handover command.

Optionally, the falling back, by the terminal to a handover process indicated by a handover command includes:
terminating, by the terminal, the process of the conditional handover; or skipping, by the terminal, initiating access to the first target cell that meets the trigger condition for a conditional handover; or
terminating, by the terminal, ongoing access that is initiated to the first target cell that meets the trigger condition for a conditional handover.

The terminating, by the terminal, the process of the conditional handover includes:
stopping a first timer and/or second timer that is operating.

The first timer is a timer used to determine whether the conditional handover fails, for example, the first timer is T304.

The second timer is a timer used to control conditional handover configuration or deconfiguration. For example, the second timer may be referred to as T3xx or the like.

It should be noted that, during an operating period of the second timer, a handover command for the conditional handover is valid or configuration information of the conditional handover is valid; otherwise, a handover command for the conditional handover is invalid or configuration information of the conditional handover is invalid.

Optionally, the second timer is used to determine whether a random access resource reserved or configured for the terminal handover by the candidate target cell is valid. For example, during the operating period of the second timer, the random access resources reserved or configured for the terminal handover by the candidate target cell is valid; and when the second timer expires or is stopped, random access resource reserved or configured for the terminal handover by the candidate target cell becomes invalid.

Optionally, the falling back, by the terminal to a handover process indicated by a handover command includes:
initiating access to a second target cell corresponding to the handover command.

Optionally, the initiating access to a second target cell corresponding to the handover command includes:
initiating, by the terminal, access to the second target cell by using a resource configured by the handover command for the conditional handover (which may be referred to as a conditional handover command); or
initiating, by the terminal, access to the second target cell by using a resource configured by a handover command (which may be referred to as a common handover command) that is sent by the source cell and that is received during the process of the conditional handover.

Optionally, when the terminal falls back to the handover process indicated by the handover command, the method further includes:
during an access process initiated by the terminal to the second target cell, restarting a preamble transmission counter (PREAMBLE_TRANSMISSION_ COUNTER) and/or a preamble power ramp counter (PREAMBLE_POWER_RAMPING_COUNTER); or
in the case that the second target cell is the same as the first target cell, continuing with a preamble transmission counter (PREAMBLE_TRANSMISSION_ COUNTER) and/or a preamble power ramp counter (PREAMBLE_POWER_RAMPING_COUNTER) during an access process initiated by the terminal to the second target cell; or
in the case that the second target cell is the same as the first target cell and the terminal initiates access to the second target cell by using a resource configured by a handover command for the conditional handover, continuing with a preamble transmission counter (PREAMBLE_TRANSMISSION_COUNTER) and/or a preamble power ramp counter (PREAMBLE_POWER_RAMPING_COUNTER) during an access process initiated by the terminal to the second target cell.

Optionally, when the terminal falls back to the handover process indicated by the handover command, the method further includes:

stopping, by the terminal, a first timer and/or second timer that is operating; or restarting, by the terminal, a first timer and/or second timer; or in the case that the terminal initiates access to the second target cell by using a resource configured by a handover command for the conditional handover, continuing, by the terminal, to run a first timer and/or a second timer, where the first timer is a timer used to determine whether the conditional handover fails; and the second timer is a timer used to control conditional handover configuration or deconfiguration.

During an operating period of the second timer, a handover command for the conditional handover is valid or configuration information of the conditional handover is valid; otherwise, a handover command for the conditional handover is invalid or configuration information of the conditional handover is invalid.

Optionally, the second timer is used to determine whether a random access resource reserved or configured for the terminal handover by the candidate target cell is valid. For example, during the operating period of the second timer, the random access resources reserved or configured for the terminal handover by the candidate target cell is valid; and when the second timer expires or is stopped, random access resource reserved or configured for the terminal handover by the candidate target cell becomes invalid.

Optionally, the continuing, by the terminal, to perform the conditional handover includes:

ignoring, by the terminal, the handover command, and continuing to initiate access to the first target cell that meets the trigger condition for a conditional handover, or continuing with ongoing access that is initiated to the first target cell that meets the trigger condition for a conditional handover.

Alternatively, the continuing, by the terminal, to perform the conditional handover includes:

continuing, by the terminal based on the handover command, to initiate access to the first target cell that meets the trigger condition for a conditional handover, or continuing with ongoing access that is initiated to the first target cell that meets the trigger condition for a conditional handover.

Optionally, the continuing, by the terminal based on the handover command, to initiate access to the first target cell that meets the trigger condition for a conditional handover includes:

when a second target cell corresponding to the handover command is the same as the first target cell that meets the trigger condition for a conditional handover, initiating, by the terminal, access to the first target cell by using a resource configured by the handover command.

Optionally, when the terminal continues to perform the conditional handover, the method further includes:

during an access process initiated by the terminal to the first target cell, continuing with a preamble transmission counter (PREAMBLE_TRANSMISSION_COUNTER) and/or a preamble power ramp counter (PREAMBLE_POWER_RAMPING_COUNTER); or during an access process initiated by the terminal to the first target cell, restarting a preamble transmission counter (PREAMBLE_TRANSMISSION_ COUNTER) and/or a preamble power ramp counter (PREAMBLE_POWER_RAMPING_COUNTER).

Optionally, when the terminal continues to perform the conditional handover, the method further includes:

stopping, by the terminal, a first timer and/or second timer that is operating; or restarting, by the terminal, a first timer and/or second timer; or in the case that the terminal initiates access to the first target cell by using a resource configured by a handover command for the conditional handover, continuing, by the terminal, to run a first timer and/or a second timer, where the first timer is a timer used to determine whether the conditional handover fails; and the second timer is a timer used to control conditional handover configuration or deconfiguration.

During an operating period of the second timer, a handover command for the conditional handover is valid or configuration information of the conditional handover is valid; otherwise, a handover command for the conditional handover is invalid or configuration information of the conditional handover is invalid.

Optionally, the second timer is used to determine whether a random access resource reserved or configured for the terminal handover by the candidate target cell is valid. For example, during the operating period of the second timer, the random access resources reserved or configured for the terminal handover by the candidate target cell is valid; and when the second timer expires or is stopped, random access resource reserved or configured for the terminal handover by the candidate target cell becomes invalid.

In conclusion, in this embodiment of the present disclosure, when the terminal receives, during the process of the conditional handover, a common handover command sent by the source cell, the terminal falls back to the common handover process or continues to perform the conditional handover, which can ensure integrity of signaling and improve a handover procedure.

Figure 2:
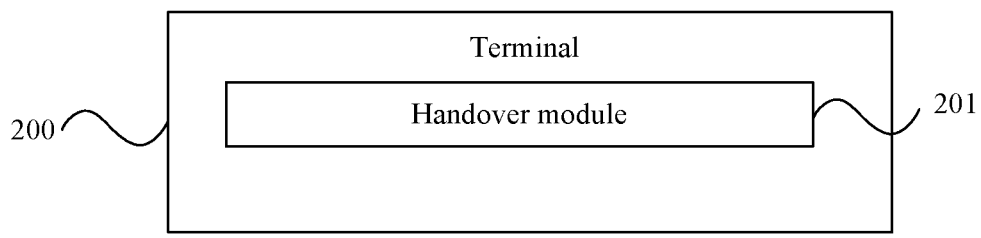
FIG. 2 is a schematic structural diagram 1 of a terminal according to an embodiment of the present disclosure.

As shown in FIG. 2, an embodiment of the present disclosure further provides a terminal, including:

a handover module 201, configured to fall back to a handover process indicated by a handover command, or continue to perform a conditional handover in the case that the handover command sent by a source cell is received during a process of the conditional handover, where the handover command does not carry a trigger condition for a conditional handover.

Optionally, in this embodiment of the present disclosure, the handover module 201 includes:

a first handover submodule, configured to: in the case that the handover command sent by the source cell is received before the trigger condition for a conditional handover is met or before the terminal initiates access to a first target cell that meets the trigger condition for a conditional handover, fall back to the handover process indicated by the handover command.

Optionally, in this embodiment of the present disclosure, the handover module 201 includes:

a second handover submodule, configured to: in the case that the handover command sent by the source cell is received after the trigger condition for a conditional handover is met or after the terminal initiates access to a first target cell that meets the trigger condition for a conditional handover or before the terminal successfully accesses a first target cell that meets the trigger condition for a conditional handover, fall back to the handover process indicated by the handover command; or configured to: in the case that the handover command sent by the source cell is received after the trigger condition for a conditional handover is met or after the terminal initiates access to a first target cell that meets the trigger condition for a conditional handover or before the terminal successfully accesses a first target cell that meets the trigger condition for a conditional handover, continue, by the terminal, to perform the conditional handover.

Optionally, in this embodiment of the present disclosure, the handover module 201 is further configured to:

fall back to the handover process indicated by the handover command; or fall back, after a preset time length, to the handover process indicated by the handover command.

Optionally, in this embodiment of the present disclosure, the handover module 201 is further configured to:

initiate access to a second target cell corresponding to the handover command.

Optionally, in this embodiment of the present disclosure, the handover module 201 is further configured to:

terminate the process of the conditional handover; or skip initiating access to the first target cell that meets the trigger condition for a conditional handover; or terminate ongoing access that is initiated to the first target cell that meets the trigger condition for a conditional handover Optionally, in this embodiment of the present disclosure, the handover module 201 is further configured to:

stop a first timer and/or second timer that is operating, where the first timer is a timer used to determine whether the conditional handover fails; and the second timer is a timer used to control conditional handover configuration or deconfiguration.

Optionally, in this embodiment of the present disclosure, during an operating period of the second timer, a handover command for the conditional handover is valid or configuration information of the conditional handover is valid; otherwise, a handover command for the conditional handover is invalid or configuration information of the conditional handover is invalid.

Optionally, in this embodiment of the present disclosure, the handover module 201 is further configured to:

initiate access to the second target cell by using a resource configured by a handover command for the conditional handover; or initiate access to the second target cell by using a resource configured by a handover command that is sent by the source cell and that is received during the process of the conditional handover.

Optionally, in this embodiment of the present disclosure, the terminal further includes:

a counting module, configured to: during an access process initiated by the terminal to the second target cell, restart a preamble transmission counter and/or a preamble power ramp counter; or configured to: in the case that the second target cell is the same as the first target cell, continue with a preamble transmission counter and/or a preamble power ramp counter during an access process initiated by the terminal to the second target cell; or configured to: in the case that the second target cell is the same as the first target cell and the terminal initiates access to the second target cell by using a resource configured by a handover command for the conditional handover, continue with a preamble transmission counter and/or a preamble power ramp counter during an access process initiated by the terminal to the second target cell.

Optionally, in this embodiment of the present disclosure, the terminal further includes:

a first processing module, configured to stop a first timer and/or second timer that is operating; or configured to restart a first timer and/or second timer; or configured to: in the case that the terminal initiates access to the second target cell by using a resource configured by a handover command for the conditional handover, continue to run a first timer and/or a second timer, where the first timer is a timer used to determine whether the conditional handover fails; and the second timer is a timer used to control conditional handover configuration or deconfiguration.

Optionally, in this embodiment of the present disclosure, during an operating period of the second timer, a handover command for the conditional handover is valid or configuration information of the conditional handover is valid; otherwise, a handover command for the conditional handover is invalid or configuration information of the conditional handover is invalid.

Optionally, in this embodiment of the present disclosure, the handover module is further configured to:

ignore the handover command and continue to initiate access to the first target cell that meets the trigger condition for a conditional handover, or continue with ongoing access that is initiated to the first target cell that meets the trigger condition for a conditional handover.

Optionally, in this embodiment of the present disclosure, the handover module 201 is further configured to:

continue, based on the handover command, to initiate access to the first target cell that meets the trigger condition for a conditional handover, or continue with ongoing access that is initiated to the first target cell that meets the trigger condition for a conditional handover.

Optionally, in this embodiment of the present disclosure, the handover module 201 is further configured to:

when a second target cell corresponding to the handover command is the same as the first target cell that meets the trigger condition for a conditional handover, initiate access to the first target cell by using a resource configured by the handover command for the conditional handover.

Optionally, in this embodiment of the present disclosure, the terminal further includes:

a second processing module, configured to: during an access process initiated by the terminal to the first target cell, continue with a preamble transmission counter and/or a preamble power ramp counter; or configured to: during an access process initiated by the terminal to the first target cell, restart a preamble transmission counter and/or a preamble power ramp counter.

Optionally, in this embodiment of the present disclosure, the terminal further includes:

a third processing module, configured to stop a first timer and/or second timer that is operating; or configured to restart a first timer and/or second timer; or configured to: in the case that the terminal initiates access to the first target cell by using a resource configured by a handover command for the conditional handover, continue to run a first timer and/or a second timer, where the first timer is a timer used to determine whether the conditional handover fails; and the second timer is a timer used to control conditional handover configuration or deconfiguration.

Optionally, in this embodiment of the present disclosure, during an operating period of the second timer, a handover command for the conditional handover is valid or configuration information of the conditional handover is valid; otherwise, a handover command for the conditional handover is invalid or configuration information of the conditional handover is invalid.

The terminal provided the embodiments of the present disclosure can implement processes implemented by the terminal in the method embodiment shown in FIG. 1. To avoid repetition, details are not described herein again.

In conclusion, in this embodiment of the present disclosure, when the terminal receives, during the process of the conditional handover, a common handover command sent by the source cell, the terminal falls back to the common handover process or continues to perform the conditional handover, which can ensure integrity of signaling and improve a handover procedure.

It should be noted that the terminal provided in the embodiments of the present disclosure is a terminal capable of executing the foregoing handover method, and all embodiments of the foregoing handover method are applicable to the terminal, and can achieve same or similar beneficial effects.

Figure 3:
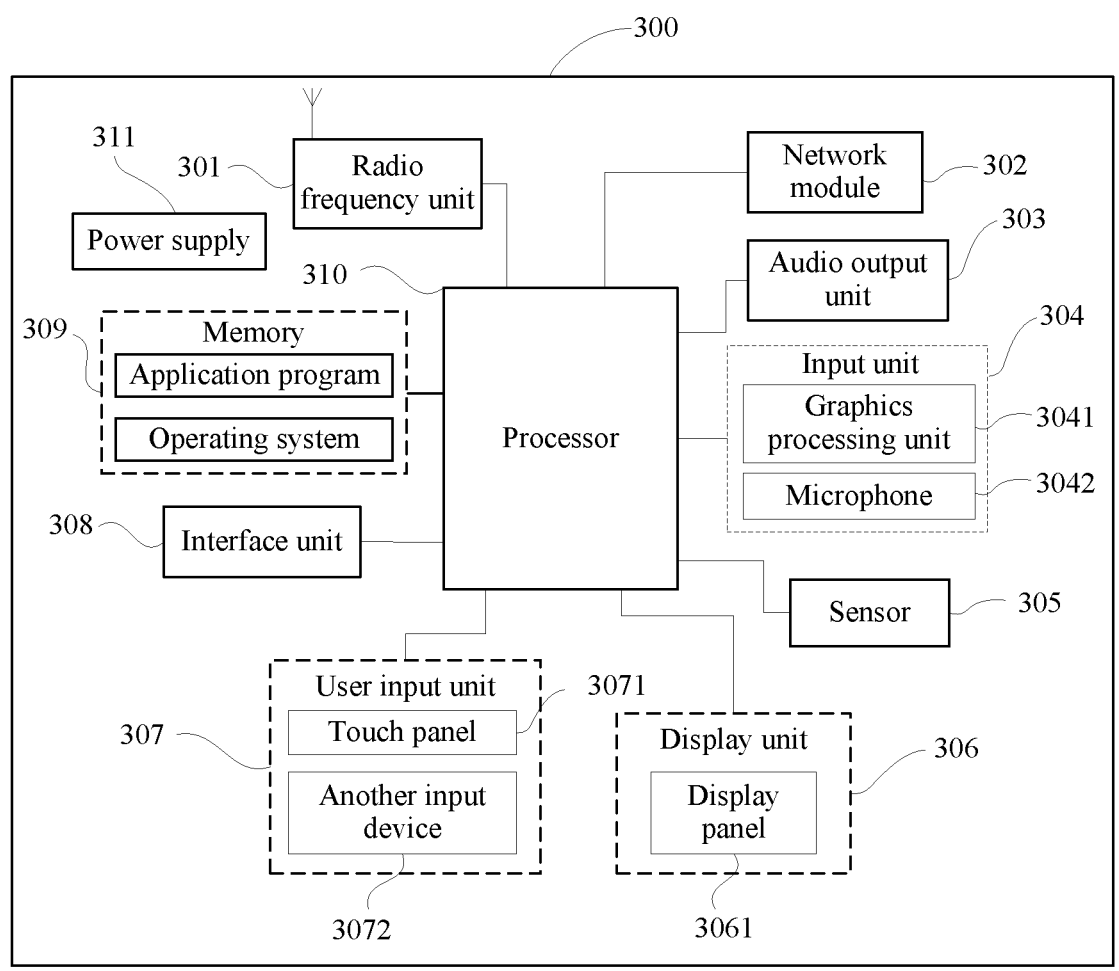
FIG. 3 is a schematic structural diagram 2 of a terminal according to an embodiment of the present disclosure.

FIG. 3 is a schematic structural diagram of hardware of a terminal implementing embodiments of the present disclosure. The terminal 300 includes but is not limited to: a radio frequency unit 301, a network module 302, an audio output unit 303, an input unit 304, a sensor 305, a display unit 306, a user input unit 307, an interface unit 308, a memory 309, a processor 310, a power supply 311, and other components. A person skilled in the art may understand that the structure of the terminal shown in FIG. 3 does not constitute a limitation on the terminal, and the terminal may include more or fewer components than those shown in the figure, or combine some components, or have different component arrangements. In this embodiment of the present disclosure, the terminal includes but is not limited to a mobile phone, a tablet computer, a laptop computer, a palmtop computer, a vehicle-mounted terminal, a wearable device, a pedometer, and the like.

The radio frequency unit 301 is configured to receive a handover command sent by a source cell during a process of a conditional handover.

The processor 310 is configured to: fall back to a handover process indicated by the handover command, or continue to perform the conditional handover, where the handover command does not carry a trigger condition for a conditional handover.

In conclusion, in this embodiment of the present disclosure, when the terminal receives, during the process of the conditional handover, a common handover command sent by the source cell, the terminal falls back to the common handover process or continues to perform the conditional handover, which can ensure integrity of signaling and improve a handover procedure.

It should be noted that the terminal provided in the embodiments of the present disclosure is a terminal capable of executing the foregoing handover method, and all embodiments of the foregoing handover method are applicable to the terminal, and can achieve same or similar beneficial effects.

It should be understood that in this embodiment of the present disclosure, the radio frequency unit 301 may be configured to receive and transmit information, or receive and transmit a signal during a call. For example, the radio frequency unit 301 receives downlink data from a base station, and then transmits the downlink data to the processor 310 for processing; and in addition, transmits uplink data to the base station. Usually, the radio frequency unit 301 includes but is not limited to, an antenna, at least one amplifier, a transceiver, a coupler, a low noise amplifier, a duplexer, and the like. In addition, the radio frequency unit 301 can further communicate with network and another equipment via a wireless communication system.

The terminal provides a user with wireless broadband internet access by using the network module 302, for example, helping the user receive and send an email, browse a web page, and access streaming media.

The audio output unit 303 may convert audio data received by the radio frequency unit 301 or the network module 302 or stored in the memory 309 into an audio signal and output the audio signal as a sound. Moreover, the audio output unit 303 may further provide an audio output (for example, call signal receiving sound and message receiving sound) related to a specific function performed by the terminal 300. The audio output unit 303 includes a loudspeaker, a buzzer, a receiver, and the like.

The input unit 304 is configured to receive audio or video signals. The input unit 304 may include a graphics processing unit (GPU) 3041 and a microphone 3042. The graphics processing unit 3041 processes image data of a static picture or a video obtained by an image capturing apparatus (for example, a camera) in a video capturing mode or an image capturing mode. A processed image frame can be displayed on the display unit 306. The image frame processed by the graphics processing unit 3041 can be stored in the memory 309 (or another storage medium) or sent by the radio frequency unit 301 or the network module 302. The microphone 3042 can receive sound, and can process such sound into audio data. The processed audio data can be converted, in a telephone calling mode, into a format that can be sent by the radio frequency unit 301 to a mobile communications base station for output.

The terminal 300 further includes at least one sensor 305, such as a light sensor, a motion sensor, and other sensors. The light sensor includes an ambient light sensor and a proximity sensor, where the ambient light sensor can adjust brightness of the display panel 3061 according to brightness of ambient light, and the proximity sensor can turn off the display panel 3061 and/or backlight when the terminal 300 moves towards the ear. As a type of the motion sensor, an accelerometer sensor may detect an acceleration in each direction (generally, three axes), and detect a value and a direction of gravity when the accelerometer sensor is static, and may be used to recognize a terminal posture (such as screen switching between landscape and portrait modes, a related game, or magnetometer posture calibration), a function related to vibration recognition (such as a pedometer or a knock), and the like. The sensor 305 may further include a fingerprint sensor, a pressure sensor, an iris sensor, a molecular sensor, a gyroscope, a barometer, a hygrometer, a thermometer, and an infrared sensor. Details are not described herein.

The display unit 306 is configured to display information input by a user or information provided to a user. The display unit 306 may include the display panel 3061, and the display panel 3061 may be configured in a form of a liquid crystal display (LCD), an organic light-emitting diode (OLED), or the like.

The user input unit 307 may be configured to receive input digit or character information and generate key signal input related to user settings and function control of the terminal. The user input unit 307 includes a touch panel 3071 and another input device 3072. The touch panel 3071, also called a touch screen, can collect a touch operation of the user on or near the touch panel 3071 (For example, the user uses any suitable object or accessory such as a finger or a stylus to operate on or near the touch panel 3071). The touch panel 3071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, transmits the contact coordinates to the processor 310, receives a command sent by the processor 310, and executes the command. In addition, the touch panel 3071 can be implemented in various types such as resistive, capacitive, infrared, and surface acoustic wave. In addition to the touch panel 3071, the user input unit 307 may further include the another input device 3072. The other input devices 3072 may include but are not limited to a physical keyboard, function keys (such as a volume control key and an on/off key), a trackball, a mouse, and a joystick. Details are not described herein.

Optionally, the touch panel 3071 can cover the display panel 3061. When detecting a touch operation on or near the touch panel 3071, the touch panel 3071 transmits the touch operation to the processor 310 to determine a type of a touch event. Then, the processor 310 provides corresponding visual output on the display panel 3061 based on the type of the touch event. In FIG. 3, the touch panel 3071 and the display panel 3061 are used as two independent components to implement input and output functions of the terminal. However, in some embodiments, the touch panel 3071 and the display panel 3061 may be integrated to implement the input and output functions of the terminal. This is not specifically limited herein.

The interface unit 308 is an interface for connecting an external apparatus to the terminal 300. For example, the interface unit 308 may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 308 may be configured to: receive input (for example, data information and power) from an external apparatus, and transmit the received input to one or more elements inside the terminal 300; or may be configured to transmit data between the terminal 300 and the external apparatus.

The memory 309 may be configured to store a software program and various data. The memory 309 may mainly include a program storage area and a data storage area. The program storage area may store an operating system, an application program required by at least one function (such as a sound play function and an image display function), and the like. The data storage area may store data (such as audio data and a phone book) created based on use of the mobile phone, and the like. In addition, the memory 309 may include a high-speed random access memory or a nonvolatile memory, for example, at least one disk storage device, a flash memory, or another volatile solid-state storage device.

The processor 310 is a control center of the terminal. The processor 310 uses various interfaces and lines to connect the various parts of the entire terminal, and performs various functions of the terminal and processes data by running or executing software programs and/or modules stored in the memory 309 and invoking data stored in the memory 309, to monitor the terminal as a whole. The processor 310 may include one or more processing units. Optionally, the processor 310 may be integrated with an application processor and a modem processor. The application processor mainly processes an operating system, a user interface, an application program, and the like. The modem processor mainly processes wireless communications. It may be understood that alternatively, the modem processor may not be integrated into the processor 310.

The terminal 300 may further include a power supply 311 (for example, a battery) that supplies power to various components. Optionally, the power supply 311 may be logically connected to the processor 310 through a power supply management system, to perform functions of managing charging, discharging, and power consumption through the power supply management system.

In addition, the terminal 300 includes some function modules not shown, and details are not described herein again.

Optionally, an embodiment of the present disclosure further provides a terminal, including: a processor, a memory, and a computer program stored in the memory and executable on the processor. When the computer program is executed by the processor, the processes of the foregoing handover method embodiment are implemented, and a same technical effect can be achieved. To avoid repetition, details are not described herein again.

An embodiment of the present disclosure further provides a non-transitory computer-readable storage medium. The non-transitory computer-readable storage medium stores a computer program. When the computer program is executed by a processor, the processes of the foregoing handover method embodiment are implemented, and a same technical effect can be achieved. To avoid repetition, details are not described herein again. The non-transitory computer-readable storage medium is, for example, a read-only memory (ROM), a random access memory (RAM), a magnetic disk, a compact disc, or the like.

It should be noted that in this specification, the terms "comprise", "include", and any other variants thereof are intended to cover non-exclusive inclusion, so that a process, a method, an article, or an apparatus that includes a series of elements not only includes these elements, but also includes other elements not expressly listed, or further includes elements inherent to this process, method, article, or apparatus. Without being subject to further limitations, an element defined by a phrase "including a . . . " does not exclude presence of other identical elements in the process, method, article, or apparatus that includes the very element.

By means of the foregoing description of the embodiments, a person skilled in the art may clearly understand that the method in the foregoing embodiments may be implemented by software with a necessary general hardware platform. Certainly, the method in the foregoing embodiments may also be implemented by hardware. However, in many cases, the former is a preferred embodiment. Based on such an understanding, the technical solutions of the present disclosure essentially, or the part contributing to the related technologies may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of the present disclosure.

The embodiments of the present disclosure are described above with reference to the accompanying drawings, but the present disclosure is not limited to the foregoing specific implementations. The foregoing specific implementations are merely illustrative but not restrictive. Under enlightenment of the present disclosure, a person of ordinary skill in the art may make many forms without departing from the principles of the present disclosure and the protection scope of the claims, all of which fall within the protection of the present disclosure.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A handover method, applied to a terminal and comprising:
    falling back, by the terminal to a handover process indicated by a handover command, or continuing, by the terminal, to perform a conditional handover in a case that the handover command sent by a source cell is received during a process of the conditional handover, wherein
    the handover command does not carry a trigger condition for a conditional handover;
    wherein the falling back, by the terminal to a handover process indicated by a handover command, or continuing, by the terminal, to perform a conditional handover in a case that the handover command sent by a source cell is received during a process of the conditional handover comprises:
    in a case that the handover command sent by the source cell is received after the trigger condition for a conditional handover is met or after the terminal initiates access to a first target cell that meets the trigger condition for a conditional handover or before the terminal successfully accesses a first target cell that meets the trigger condition for a conditional handover, falling back, by the terminal, to the handover process indicated by the handover command; or
    in a case that the handover command sent by the source cell is received after the trigger condition for a conditional handover is met or after the terminal initiates access to a first target cell that meets the trigger condition for a conditional handover or before the terminal successfully accesses a first target cell that meets the trigger condition for a conditional handover, continuing, by the terminal, to perform the conditional handover.

2. The method according to claim 1, wherein the falling back, by the terminal to a handover process indicated by a handover command in a case that the handover command sent by a source cell is received during a process of the conditional handover further comprises:
    in a case that the handover command sent by the source cell is received before the trigger condition for a conditional handover is met or before the terminal initiates access to a first target cell that meets the trigger condition for a conditional handover, falling back, by the terminal, to the handover process indicated by the handover command.

3. The method according to claim 1, wherein the falling back, by the terminal to a handover process indicated by a handover command comprises:
    falling back, by the terminal to the handover process indicated by the handover command; or
    falling back, by the terminal after a preset time length, to the handover process indicated by the handover command.

4. The method according to claim 1, wherein the falling back, by the terminal to a handover process indicated by a handover command comprises:
    initiating access to a second target cell corresponding to the handover command.

5. The method according to claim 1, wherein the falling back, by the terminal to a handover process indicated by a handover command comprises:
    terminating, by the terminal, the process of the conditional handover; or
    skipping, by the terminal, initiating access to the first target cell that meets the trigger condition for a conditional handover; or
    terminating, by the terminal, ongoing access that is initiated to the first target cell that meets the trigger condition for a conditional handover.

6. The method according to claim 5, wherein the terminating, by the terminal, the process of the conditional handover comprises:
    stopping a first timer and/or second timer that is operating, wherein
    the first timer is a timer used to determine whether the conditional handover fails; and
    the second timer is a timer used to control conditional handover configuration or deconfiguration.

7. The method according to claim 6, wherein during an operating period of the second timer, a handover command for the conditional handover is valid or configuration information of the conditional handover is valid; otherwise, a handover command for the conditional handover is invalid or configuration information of the conditional handover is invalid.

8. The method according to claim 4, wherein the initiating access to a second target cell corresponding to the handover command comprises:
    initiating, by the terminal, access to the second target cell by using a resource configured by a handover command for the conditional handover; or
    initiating, by the terminal, access to the second target cell by using a resource configured by a handover command that is sent by the source cell and that is received during the process of the conditional handover.

9. The method according to claim 4, further comprising:
    during an access process initiated by the terminal to the second target cell, restarting a preamble transmission counter and/or a preamble power ramp counter; or in a case that the second target cell is a same as the first target cell that meets the trigger condition for a conditional handover, continuing with a preamble transmission counter and/or a preamble power ramp counter during an access process initiated by the terminal to the second target cell; or in a case that the second target cell is the same as the first target cell that meets the trigger condition for a conditional handover and the terminal initiates access to the second target cell by using a resource configured by a handover command for the conditional handover, continuing with a preamble transmission counter and/or a preamble power ramp counter during an access process initiated by the terminal to the second target cell.

10. The method according to claim 4, further comprising:
stopping, by the terminal, a first timer and/or second timer that is operating; or
restarting, by the terminal, a first timer and/or second timer; or
in a case that the terminal initiates access to the second target cell by using a resource configured by a handover command for the conditional handover, continuing, by the terminal, to run a first timer and/or a second timer, wherein
the first timer is a timer used to determine whether the conditional handover fails; and
the second timer is a timer used to control conditional handover configuration or deconfiguration.

11. The method according to claim 10, wherein during an operating period of the second timer, the handover command for the conditional handover is valid or configuration information of the conditional handover is valid; otherwise, the handover command for the conditional handover is invalid or configuration information of the conditional handover is invalid.

12. The method according to claim 1, wherein the continuing, by the terminal, to perform the conditional handover comprises:
ignoring, by the terminal, the handover command, and continuing to initiate access to the first target cell that meets the trigger condition for a conditional handover, or continuing with ongoing access that is initiated to the first target cell that meets the trigger condition for a conditional handover.

13. The method according to of claim 1, wherein the continuing, by the terminal, to perform the conditional handover comprises:
continuing, by the terminal based on the handover command, to initiate access to the first target cell that meets the trigger condition for a conditional handover, or continuing with ongoing access that is initiated to the first target cell that meets the trigger condition for a conditional handover.

14. The method according to claim 13, wherein the continuing, by the terminal based on the handover command, to initiate access to the first target cell that meets the trigger condition for a conditional handover comprises:
in a case that a second target cell corresponding to the handover command is the same as the first target cell that meets the trigger condition for a conditional handover, initiating, by the terminal, access to the first target cell by using a resource configured by the handover command.

15. The method according to of claim 1, wherein when the terminal continues to perform the conditional handover, the method further comprises:

during an access process initiated by the terminal to the first target cell, continuing with a preamble transmission counter and/or a preamble power ramp counter; or
during an access process initiated by the terminal to the first target cell, restarting a preamble transmission counter and/or a preamble power ramp counter.

16. The method according to of claim 1, wherein when the terminal continues to perform the conditional handover, the method further comprises:
stopping, by the terminal, a first timer and/or second timer that is operating; or
restarting, by the terminal, a first timer and/or second timer; or
in a case that the terminal initiates access to the first target cell by using a resource configured by a handover command for the conditional handover, continuing, by the terminal, to run a first timer and/or a second timer, wherein
the first timer is a timer used to determine whether the conditional handover fails; and
the second timer is a timer used to control conditional handover configuration or deconfiguration.

17. The method according to claim 16, wherein during an operating period of the second timer, a handover command for the conditional handover is valid or configuration information of the conditional handover is valid; otherwise, a handover command for the conditional handover is invalid or configuration information of the conditional handover is invalid.

18. A terminal, comprising a processor, a memory, and a computer program stored in the memory and executable on the processor, wherein the computer program, when executed by the processor, causes the processor to perform:
falling back to a handover process indicated by a handover command, or continuing to perform a conditional handover in the case that the handover command sent by a source cell is received during a process of the conditional handover, wherein
the handover command does not carry a trigger condition for a conditional handover;
wherein the falling back, by the terminal to a handover process indicated by a handover command, or continuing, by the terminal, to perform a conditional handover in a case that the handover command sent by a source cell is received during a process of the conditional handover comprises:
in a case that the handover command sent by the source cell is received after the trigger condition for a conditional handover is met or after the terminal initiates access to a first target cell that meets the trigger condition for a conditional handover or before the terminal successfully accesses a first target cell that meets the trigger condition for a conditional handover, falling back, by the terminal, to the handover process indicated by the handover command; or
in a case that the handover command sent by the source cell is received after the trigger condition for a conditional handover is met or after the terminal initiates access to a first target cell that meets the trigger condition for a conditional handover or before the terminal successfully accesses a first target cell that meets the trigger condition for a conditional handover, continuing, by the terminal, to perform the conditional handover.

19. A non-transitory computer-readable storage medium, wherein the non-transitory computer-readable storage medium stores a computer program, and the computer program, when executed by a processor, causes the processor to perform:
- falling back to a handover process indicated by a handover command, or continuing to perform a conditional handover in the case that the handover command sent by a source cell is received during a process of the conditional handover, wherein
- the handover command does not carry a trigger condition for a conditional handover;
- wherein the falling back, by the terminal to a handover process indicated by a handover command, or continuing, by the terminal, to perform a conditional handover in a case that the handover command sent by a source cell is received during a process of the conditional handover comprises:
- in a case that the handover command sent by the source cell is received after the trigger condition for a conditional handover is met or after the terminal initiates access to a first target cell that meets the trigger condition for a conditional handover or before the terminal successfully accesses a first target cell that meets the trigger condition for a conditional handover, falling back, by the terminal, to the handover process indicated by the handover command; or
- in a case that the handover command sent by the source cell is received after the trigger condition for a conditional handover is met or after the terminal initiates access to a first target cell that meets the trigger condition for a conditional handover or before the terminal successfully accesses a first target cell that meets the trigger condition for a conditional handover, continuing, by the terminal, to perform the conditional handover.

* * * * *